United States Patent [19]

Bubenzer

[11] 4,451,325

[45] May 29, 1984

[54] SEALING JAW FOR FORMING SEAMS IN HEAT-SEALABLE PACKAGING MATERIALS

[75] Inventor: Wilfried Bubenzer, Engelskirchen, Fed. Rep. of Germany

[73] Assignee: Robert Bosch GmbH, Stuttgart, Fed. Rep. of Germany

[21] Appl. No.: 377,883

[22] Filed: May 13, 1982

[51] Int. Cl.³ .................. B30B 15/34; H05B 3/40
[52] U.S. Cl. .................. 156/583.1; 100/93 P; 156/583.9; 219/78.01; 219/243; 219/544; 219/548
[58] Field of Search ............ 156/251, 515, 553, 583.1, 156/583.2, 583.9; 100/93 P; 219/78.01, 243, 544, 547, 548

[56] References Cited

U.S. PATENT DOCUMENTS

| | | |
|---|---|---|
| 3,253,122 | 5/1966 | Kochmer et al. ............ 156/583.2 |
| 3,816,704 | 6/1974 | Borom et al. ............ 219/544 |
| 4,215,607 | 8/1980 | Hudson et al. ............ 219/243 |
| 4,349,727 | 9/1982 | Churchill ............ 219/544 |

Primary Examiner—Michael G. Wityshyn
Attorney, Agent, or Firm—Edwin E. Greigg

[57] ABSTRACT

A sealing device for forming seams in heat-sealable packaging materials is disclosed having an electrical resistor heating element for generating heat. In order to transmit heat to a sealing surface of the sealing device in such a way that uniform temperature distribution is attained on this surface, a sheath of a highly heat-conductive metal, such as aluminum, is provided between the heating element and the sealing device. The sheath is fitted tightly into the sealing device.

3 Claims, 3 Drawing Figures

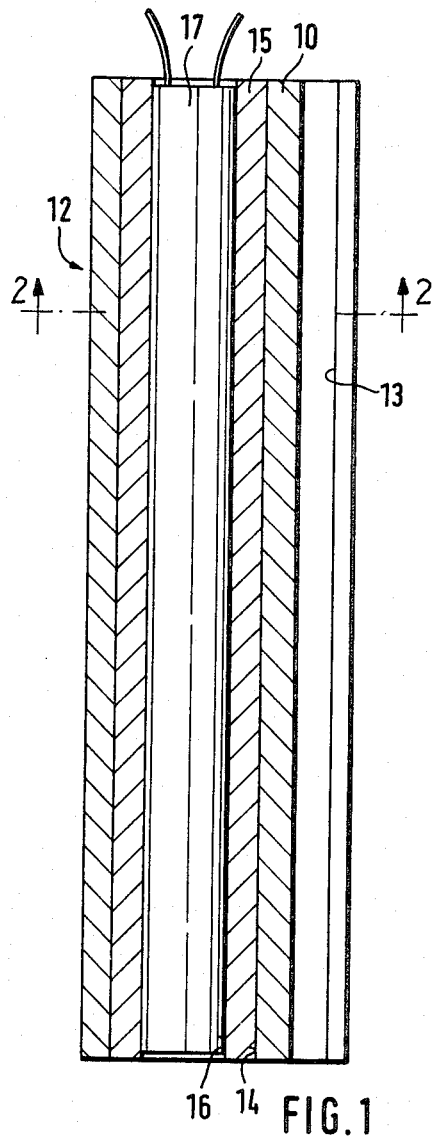
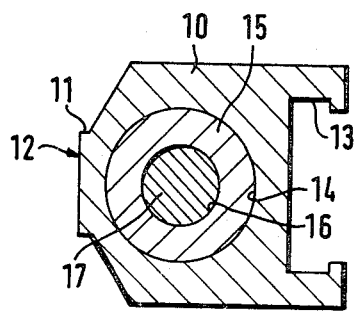
FIG. 2
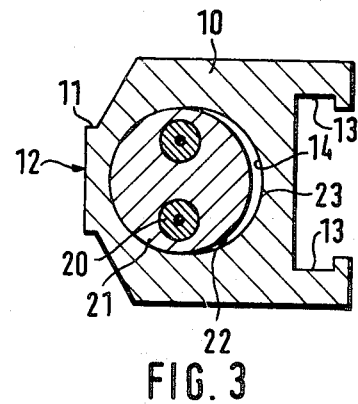
FIG. 3
FIG. 1

SEALING JAW FOR FORMING SEAMS IN HEAT-SEALABLE PACKAGING MATERIALS

BACKGROUND OF THE INVENTION

The invention is directed to a sealing device for forming seams in heat-sealable packaging materials. In a known sealing device of this kind, which is made of a chrome-alloy, heat-treated steel because of the high pressure to which it is exposed and the danger of heat deformation, the distribution of this heat, which is transmitted by the heating cartridge, to the sealing surface is very uneven. During operation, temperature differences of up to 50° C. can occur at various locations on the sealing surface because of the uneven withdrawal of heat by the packaging material which is to be heat-sealed. This heat differential can cause non-uniform strength in the sealed or welded seams.

OBJECT AND SUMMARY OF THE INVENTION

It is a principal object of the sealing device according to the invention to provide the advantage over the prior art that the heat generated by the heating element is distributed by the highly heat-conductive sheath such that this sheath assumes an evenly-distributed temperature and transmits heat to the sealing device accordingly, so that its sealing surface likewise has an evenly-distributed temperature.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 shows a sealing device according to the invention in longitudinal section;

FIG. 2 shows the sealing device of FIG. 1 in cross section; and

FIG. 3 shows a second exemplary embodiment of a sealing device in cross section.

DESCRIPTION OF THE PREFERRED EMBODIMENTS

An elongated sealing jaw 10 has a protruding sealing strip 11 on one side, having a sealing surface 12, and on the other side has a guide groove 13 for fastening to a holder, not shown. The sealing jaw 10 has a cylindrical bore 14 along its length. It is made of a wear-resistant, low-deformation chrome steel of high stability.

A thick-walled sheath 15 is seated in the bore 14 of the sealing jaw 10, fitted tightly in place, so that its outer wall is in intimate contact with the wall of the bore 14. In the exemplary embodiment of FIG. 2, the sheath 15 has a cylindrical bore 15, into which a heating cartridge 17 is inserted. The heating cartridge, of a type conventionally available on the market, contains an electrical heating resistor.

In the exemplary embodiment of FIG. 3, the heating element comprises an electrical heating rod 20 bent into the form of a U, which is enclosed by a cylindrical sheath 21 such that only the ends thereof protrude from this sheath. The sheath 21 is formed by means of pouring aluminum around the heating rod 20 and turning its circumference to close tolerances. The sheath 21, together with the heating rod 20, is pressed into the bore 14 of the sealing device 10 or, after being cooled to a lower temperature than that of the bore, is pushed into the bore such that it sits tightly in the bore 14 of the sealing jaw.

In order to reduce the transmission of heat from the sheath 21 to the sealing device 10, on the side on which the sealing jaw 10 is secured to a holder with its guide groove 13, the sheath 21 is provided with a plurality of eccentric recesses 22 on the side adjacent the guide groove 13, which alternate with reinforcement ribs 23. The gaps created by the removal of material for the recesses allows some cooling to occur so that less heat is transmitted toward the holder than toward the sealing strip 12.

It is to be noted additionally that the sealing device according to the invention is usable not only for producing heat-sealed seams but also for producing welded seams on packaging materials which are heat-sealable or weldable.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A sealing device for forming seams in heat-sealable packaging materials having a sealing surface and an elongated bore in parallel with said sealing surface in which an electrically-operated heating element is disposed, the improvement comprising a thick-walled sheath composed of a highly heat-conductive metal disposed in the bore of the sealing device and said heating element is disposed within said thick-walled sheath so that an evenly-distributed temperature is transmitted to the sealing surface of said sealing device,
    and at least one gap defined by said sheath and said bore of said sealing device on a side of said sheath remote from said sealing surface.

2. A sealing device as defined by claim 1, in which said at least one gap comprises a plurality of recesses provided in said sheath.

3. An apparatus as defined by claim 1, the improvement in which said sheath is an aluminum sheath.

* * * * *